US012679192B2

(12) United States Patent　　　　(10) Patent No.:　US 12,679,192 B2
Migendt et al.　　　　　　　　　　　 (45) Date of Patent:　　　Jul. 14, 2026

(54) CONNECTING DEVICE FOR CONNECTING A BATTERY HOUSING TO A REAR CAR BODYSHELL OF A MOTOR CAR BODY

(71) Applicant: Mercedes-Benz Group AG, Stuttgart (DE)

(72) Inventors: Arnold Migendt, Sindelfingen (DE); Andreas Lueckemann, Stuttgart (DE); Xiaodong Mao, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 267 days.

(21) Appl. No.: 18/578,492

(22) PCT Filed: Jun. 10, 2022

(86) PCT No.: PCT/EP2022/065814
§ 371 (c)(1),
(2) Date: Jan. 11, 2024

(87) PCT Pub. No.: WO2023/285043
PCT Pub. Date: Jan. 19, 2023

(65) Prior Publication Data
US 2025/0058615 A1　　　Feb. 20, 2025

(30) Foreign Application Priority Data
Jul. 12, 2021　　(DE) .................... 10 2021 003 569.0

(51) Int. Cl.
*B60K 1/04*　　　　　(2019.01)
(52) U.S. Cl.
CPC ........ *B60K 1/04* (2013.01); *B60K 2001/0416* (2013.01)

(58) Field of Classification Search
CPC .......................... B60K 1/04; B60K 2001/0416
See application file for complete search history.

(56) References Cited

U.S. PATENT DOCUMENTS 11,088,416 B2　　8/2021　Popovski et al.
11,485,415 B2 *　11/2022　Takahashi .............. B62D 21/15
(Continued)

FOREIGN PATENT DOCUMENTS

DE　　10 2016 004 577 A1　10/2017
DE　　10 2016 010 353 A1　　3/2018
(Continued)

OTHER PUBLICATIONS

International Search Report (PCT/ISA/210) issued in PCT Application No. PCT/EP2022/065814 dated Sep. 15, 2022 (2 pages).
(Continued)

*Primary Examiner* — Edwin A Young
(74) *Attorney, Agent, or Firm* — Crowell & Moring LLP

(57) ABSTRACT

A connecting device that connects a battery housing to a rear car bodyshell of a body of an electric passenger motor car. The connecting device includes a crossbeam and a plurality of fixing sleeves that are disposed in the crossbeam. Each of the plurality of fixing sleeves are passed through by a respective screw element to connect the battery housing to the rear car bodyshell by the crossbeam. The plurality of fixing sleeves each have a crash structure which is deformable when absorbing energy in an event that an accident of the electric passenger motor car causes movement of the rear car bodyshell relative to the battery housing.

8 Claims, 5 Drawing Sheets

(56)             References Cited

U.S. PATENT DOCUMENTS

2013/0333967 A1\* 12/2013 Meier ................... B60L 3/0007
                                                           180/68.5
2021/0078638 A1     3/2021 Hirota

FOREIGN PATENT DOCUMENTS

DE       10 2019 113 699 A1   11/2020
DE       10 2020 125 619 A1    4/2021
WO     WO 2021/043993 A1      3/2021

OTHER PUBLICATIONS

German-language German Office Action issued in German Application No. 10 2021 003 569.0 dated May 30, 2022 (5 pages).

\* cited by examiner

CONNECTING DEVICE FOR CONNECTING A BATTERY HOUSING TO A REAR CAR BODYSHELL OF A MOTOR CAR BODY

BACKGROUND AND SUMMARY OF THE INVENTION

The invention relates to a connecting device for connecting a battery housing to a rear car bodyshell of a body of an electric passenger motor car.

Such a connecting device is, for example, known from DE 10 2016 004 577 A1, and comprises a crossbeam, on which a plurality of fixing sleeves are received. Each of these fixing sleeves is passed through by a screw element, by means of which a battery housing or a battery support frame of the battery housing is connected to a rear car bodyshell of the body of the electric passenger motor car with the interposition of the crossbeam.

In general, in such passenger motor cars, which, not least due to the battery they carry, have a substantial vehicle weight, the problem arises, for example in the event of a frontal collision of the vehicle with an accident partner or a barrier, that the rear car bodyshell can move relative to the battery due to the inertia of the mass of the rear car bodyshell. In the event of such a frontal collision with low width overlap of the vehicle with the accident partner or a barrier, the rear car bodyshell sometimes slides forwards in the longitudinal direction of the vehicle over the battery housing of the battery. If the movements are too great, the rear car bodyshell can intrude into the battery or its battery housing. It is particularly problematic if the screw elements for fixing the battery housing in the rear car bodyshell are sheared off following the relative movement of the two components, because this usually causes particularly great intrusions into the battery housing.

The object of the present invention is thus to create a connecting device of the kind specified in the introduction, with which excessive damage to the battery or the battery housing can be reliably avoided.

The connecting device according to the invention for connecting a battery housing for a battery of an electric motor car to a rear car bodyshell of the motor car comprises a crossbeam, in which a plurality of fixing sleeves are received, each of which are passed through by a screw element, by means of which the battery housing is fixed to the rear car bodyshell by means of the crossbeam. According to the invention, the respective fixing sleeves are provided with a crash structure, which can be deformed when absorbing energy in the event that an accident causes movement of the rear car bodyshell relative to the battery housing, in particular following a frontal collision of the motor car with an accident partner or an obstacle with low width overlap.

In the event of such a frontal collision with low width overlap of the motor car with an accident partner or an obstacle (offset crash), if, due to the inertia of the mass of the rear car bodyshell, a pushing movement of the latter forwards in the longitudinal direction of the vehicle relative to the battery or the battery housing substantially arises, it is first guaranteed by means of the connecting device that the arising forces are diverted into the corresponding load paths by means of the crossbeam or are introduced into the bodyshell. It is, for example, conceivable to divert the forces into corresponding superstructures of the motor vehicle body via the battery housing itself and optionally via a battery support frame, to which the crossbeam can optionally be assigned. For this purpose, respective longitudinal beams and/or crossbeams of the motor car body are in particular provided. In a correspondingly significant accident with a movement of the rear car bodyshell relative to the battery housing forwards in the longitudinal direction of the vehicle, in the further course of the accident scenario, at least a part of the energy is then absorbed in the fixing sleeves which can be deformed, in which the respective screw elements are received.

In the further course of the accident scenario, a deliberate breakage or similar failing of the screws then arises, such that the rear car bodyshell can then be shifted along or over the battery and the battery housing with the battery modules to be protected. Via a suitable connecting device, which is coordinated to the mass of the rear car bodyshell and the battery, an optimal distribution of the high energy arising in the described frontal collision into corresponding stiff structures of the body can be achieved by means of the crossbeam, the fixing sleeves which can be deformed and, at the end of the accident scenario, by de-coupling the bodyshell and the battery, such that no excessive intrusions into the battery housing take place and thus, even in severe accidents, the high-voltage components of the battery remain undamaged. The coordination of the crossbeam, the fixing sleeves and the screw elements can in particular be scaled with regard to the power level or the energy to be absorbed, and can thus be flexibly adapted to any vehicle series with different dimensions and weights.

In a further embodiment of the invention, it has proved advantageous if the fixing sleeves respectively have an inner sleeve surrounding the screw element and an outer sleeve surrounding the inner sleeve, between which a connecting structure is arranged. In a further embodiment of the invention, this connecting structure can, for example, be formed by bars extending radially between the inner sleeve and the outer sleeve, but also by other configurations. In the region of this connecting structure or via the bars in particular, the arising energy can then be particularly efficiently absorbed when the connecting structure, for example in the form of the bars, deforms in the event that an accident correspondingly causes an application of force. A limit is created by the outer sleeve, such that a deliberate failure of the screw elements can then arise in the further course of the accident scenario.

In a further advantageous embodiment of the invention, the fixing sleeves protrude out of the crossbeam in the direction of the rear car bodyshell. A particularly favorable connection between the crossbeam and the rear car bodyshell can thus be obtained with the interposition of the battery housing.

A further favorable embodiment of the invention provides that the crossbeam has respective chamber walls, which sub-divide a plurality of chambers arranged one above the other in the vertical direction of the vehicle, the chamber walls having different wall strengths. By suitably designing the respective wall strengths of the chamber walls, the rigidity and the energy absorption capacity of the crossbeam can thus be coordinated in relation to the fixing sleeves and the screw elements and as a whole in relation to the dimensions and the weight of the entire vehicle, the rear car bodyshell and the battery.

A further advantageous embodiment provides that if an accident causes the rear car bodyshell to move relative to the battery housing following a frontal collision, the fixing sleeves are first deformed before the screw elements fail. A suitable coordination of the energy absorption capacity of the fixing sleeves and the maximum load of the screw elements thus results in a desired sequence if an accident causes a relative movement of the rear car bodyshell relative to the battery housing.

It has further proved advantageous if the rear car bodyshell shifts forwards in the longitudinal direction of the vehicle relative to the battery housing after the failure of the screw elements. If the screw elements break or fail in a similar manner due to a corresponding overload, a decoupling can thus occur between the rear car bodyshell and the battery, in order to reduce battery intrusions to a minimum even if a serious accident takes place.

A further advantageous embodiment of the invention provides that the battery housing has through openings which are passed through by the respective screw elements. This results, on the one hand, in a particularly favorable fixing of the battery housing on the rear car bodyshell, and on the other hand in a particularly favorable possibility of coordinating the described three-step sequence in the case of the relative movement of the rear car bodyshell relative to the battery housing Finally, it has proved advantageous if the crossbeam is pre-mounted with the fixing sleeves on the battery housing. The mounting complexity of the connecting device can thus be reduced to a minimum.

Further advantages, features and details of the invention arise from the description of a preferred exemplary embodiment below, as well as with the aid of the drawings. The features and combinations of features specified in the description above and the features and combinations of features specified below in the description of the figures and/or shown alone in the figures can be used not only in the combination specified in each case, but also in other combinations or on their own without exceeding the scope of the invention.

DETAILED DESCRIPTION OF THE DRAWINGS

Figure 1:
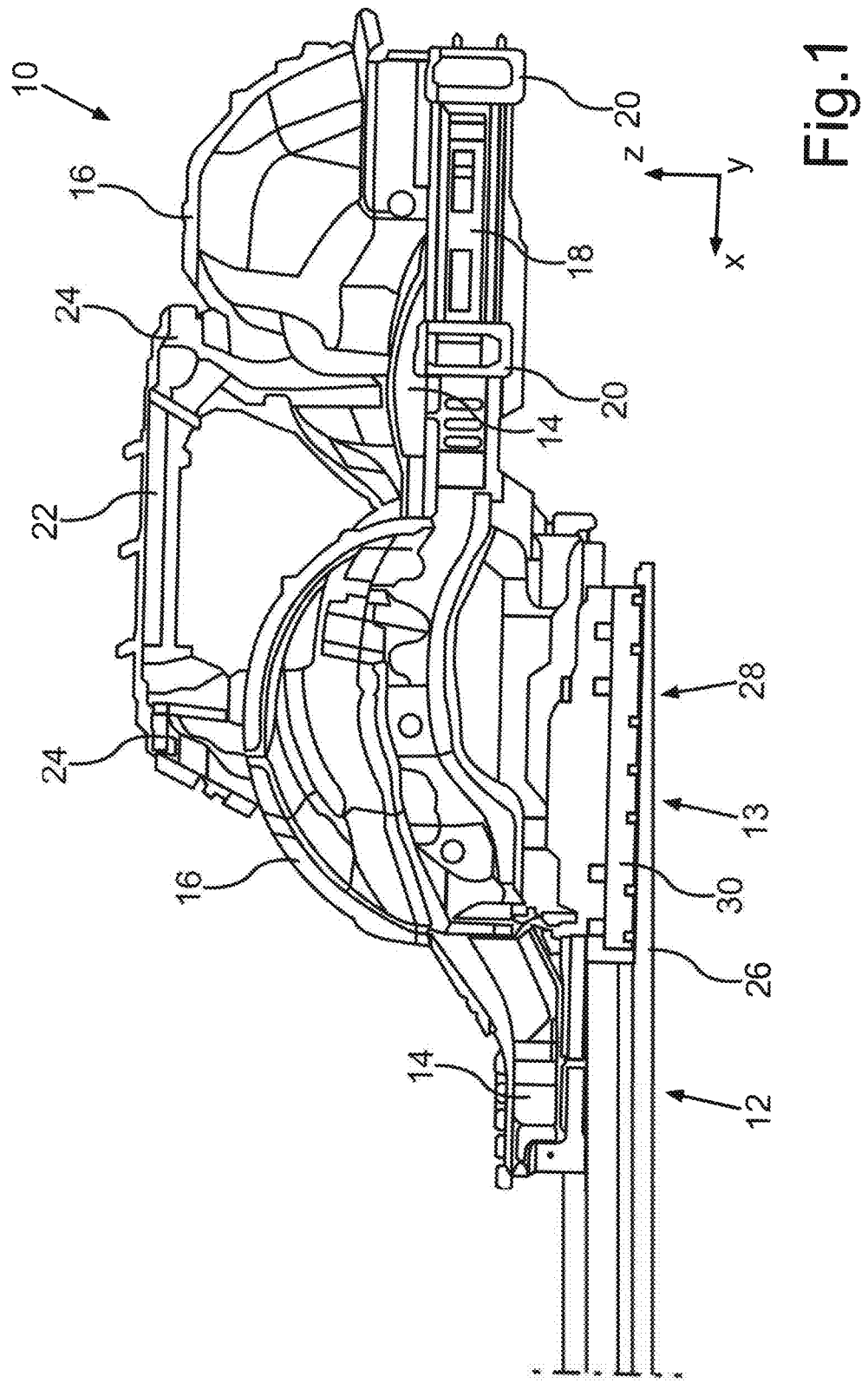
FIG. 1 is a perspective view from diagonally behind from outside of a rear car bodyshell and a partially visible battery housing arranged on the front of and underneath the rear car bodyshell, the battery housing being connected to the rear car bodyshell on the rear end of the battery housing with the interposition of the connecting device according to the invention.

In FIG. 1, a perspective view from diagonally behind from outside of a rear car bodyshell 10 of a passenger car body of an electric passenger car is represented, which comprises a high-voltage battery to supply the electric drive, which battery is received in a battery housing 12 which can be seen with a rear end region in FIG. 1. Consequently, the battery housing 12 is fixed with its rear end in relation to the longitudinal direction of the vehicle (x direction) on the front of and underneath the rear car bodyshell 10 by means of a connecting device explained in more detail in the following.

Respective longitudinal bars 14 of the rear car structure 10 can substantially be seen in FIG. 1, which longitudinal bars transition forwards into side sills which cannot be seen in the region of a main base of the passenger car body. These longitudinal bars 14 extend backwards on the inside of respective wheelhouse bodyshell parts 16 for respective rear wheels of the passenger car. On the rear end of the rear car bodyshell 10, a crossbeam 18 can also be seen, which delimits a rear base (not visible) backwards, the rear base extending between the longitudinal bars 14. Respective rear ends 20 of the longitudinal bars 14 having respective flanges on which a rear module of the motor car can be mounted can also be seen. A further crossbeam 22 can also be seen, which connects respective suspension strut domes 24 to each other, which suspension strut domes protrude upwards from the top of the wheelhouse bodyshell parts 16.

At the height of the rear end 13 of the battery housing 12, a crossbeam 26 additionally runs between the longitudinal bars 14, which—in relation to the longitudinal direction of the vehicle (x direction)—transition in their course from the outside of the vehicle inwards within the respective wheelhouse bodyshell parts 16 in this region.

Finally, a connecting device 28 explained in more detail in the following can be seen from FIG. 1, by means of which a rear end 13 of the battery housing 12 is fixed to the underside of the rear car bodyshell 10, for example in the region of the crossbeam 26 and/or in the transition region of the longitudinal bar 14 from the vehicle exterior to its position within these respective wheelhouse bodyshell parts 16.

Figure 2:
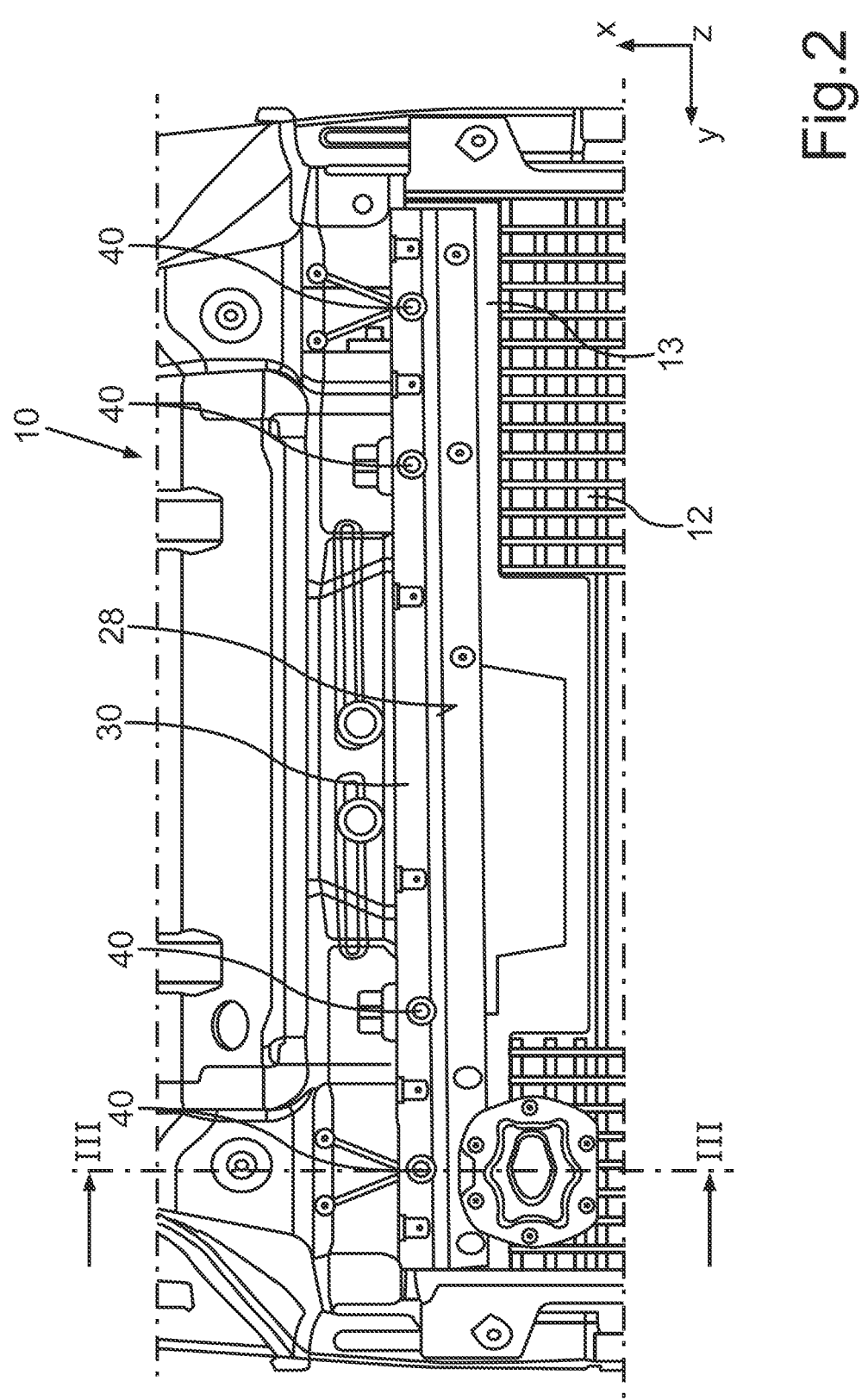
FIG. 2 shows a section of a view from below of the connecting device for connecting the rear end of the battery housing to the rear car bodyshell.

FIG. 2 shows a section of a view from below of the connecting device 28 for connecting the rear end 13 of the battery housing 12 with the rear car bodyshell 10 of the passenger car body in the region of the crossbeam 26.

Figure 3:
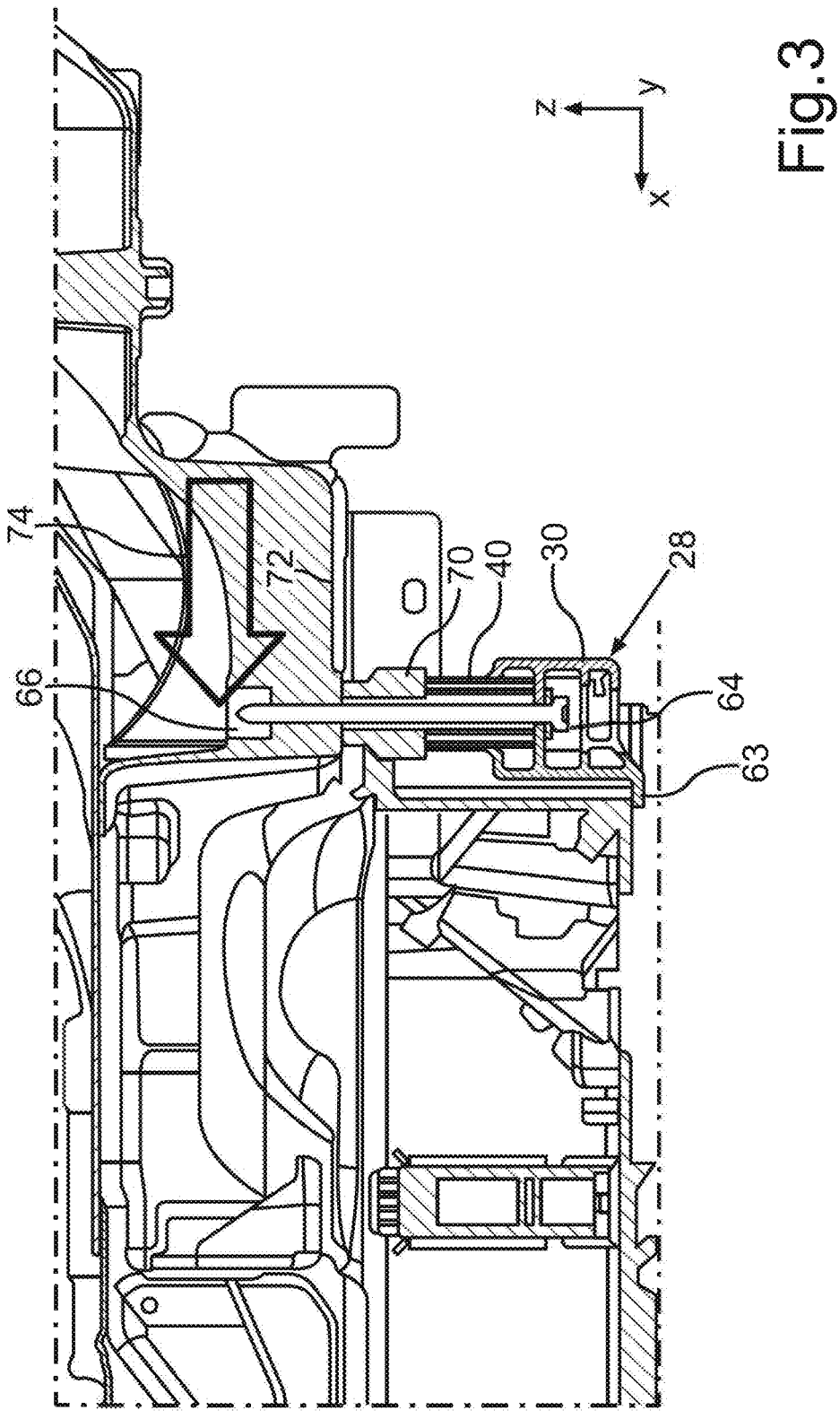
FIG. 3 shows a section of a sectional view of the connecting device for connecting the rear end of the battery housing to the rear car bodyshell arranged above the battery housing along a section plane symbolized by the line III-III in FIG. 2 in the longitudinal direction of the vehicle and vertically.

When viewed in connection with FIG. 3, which shows a section of the connecting device 28 in a sectional view along a section plane running in the longitudinal direction of the vehicle (x direction) or in the vertical direction of the vehicle (y direction) and vertically, symbolized by the section line III-III in FIG. 2, the precise fixing of the rear end 13 of the battery housing 12 to the corresponding crossbeam 26 of the rear car bodyshell 10 becomes visible.

Figure 4:
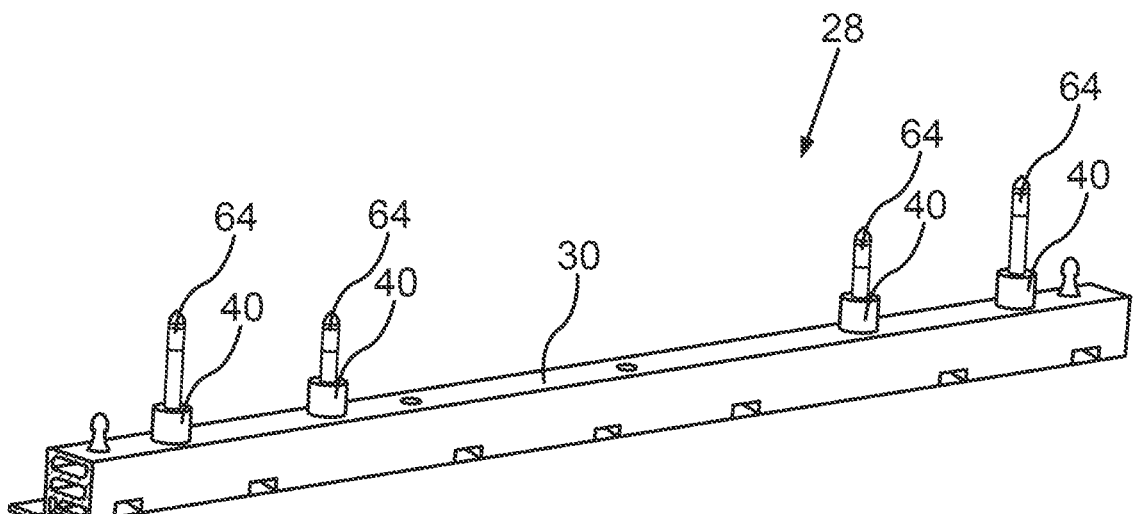
FIG. 4 is a perspective view of a crossbeam of the connecting device for connecting the rear end of the battery housing to the rear car bodyshell, wherein exactly one fixing sleeve and screw elements passing through the latter can be seen inside the crossbeam, by means of which screw elements the crossbeam, and thus the battery housing can be fixed underneath the rear car bodyshell.
Figures 6A, 6B, 7:
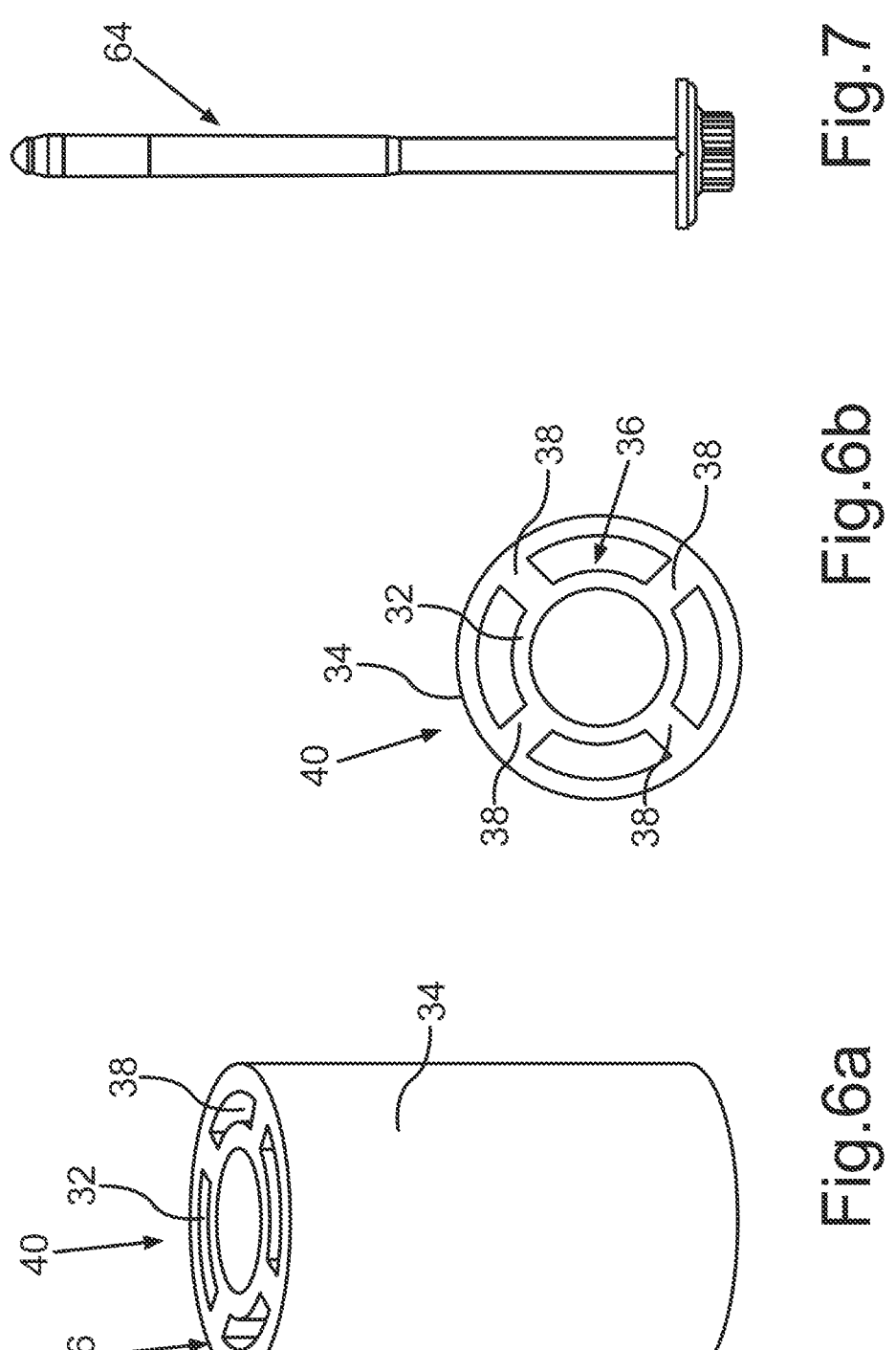
FIG. 6*a* and FIG. 6*b* are a perspectival side view and an aerial view, respectively, of one of the fixing sleeves integrated into the crossbeam.
FIG. 7 shows a side view of a screw element passing through the respectively assigned fastening sleeve, by means of which the crossbeam, and thus the battery housing, can be screwed to the underside of the rear car bodyshell.

A crossbeam 30 of the connecting device 28, which is separately depicted in FIG. 4, can in particular be seen in FIG. 3. Four fixing sleeves 40 are presently received or integrated into this crossbeam 30. In FIGS. 6*a* and 6*b*, one of these fixing sleeves 40 is depicted in a perspectival side view or an aerial view, and comprises an inner sleeve 32 which is arranged concentrically to an outer sleeve 34. In the present case, both the inner sleeve 32 and the outer sleeve 34 are annular in shape or in cross-section, wherein other cross-sections would also be conceivable, wherein in particular a spacing is provided between the inner sleeve 32 and the outer sleeve 34. This spacing is bridged in the present case by a connecting structure 36, which presently comprises four bars 38, which extend radially outwards at a respective angle of approximately 90 degrees to each other between the inner sleeve 32 and the outer sleeve 34. The entire fixing sleeve 40 is presently formed, for example, by extruding a suitable metal, or optionally also a plastic material. Naturally, other production methods are also conceivable. In particular, the connecting structure 36 with the bars 38 can also be formed differently. In addition, the fixing sleeve 40 has a crash structure, as will be explained in more detail.

Figure 5:
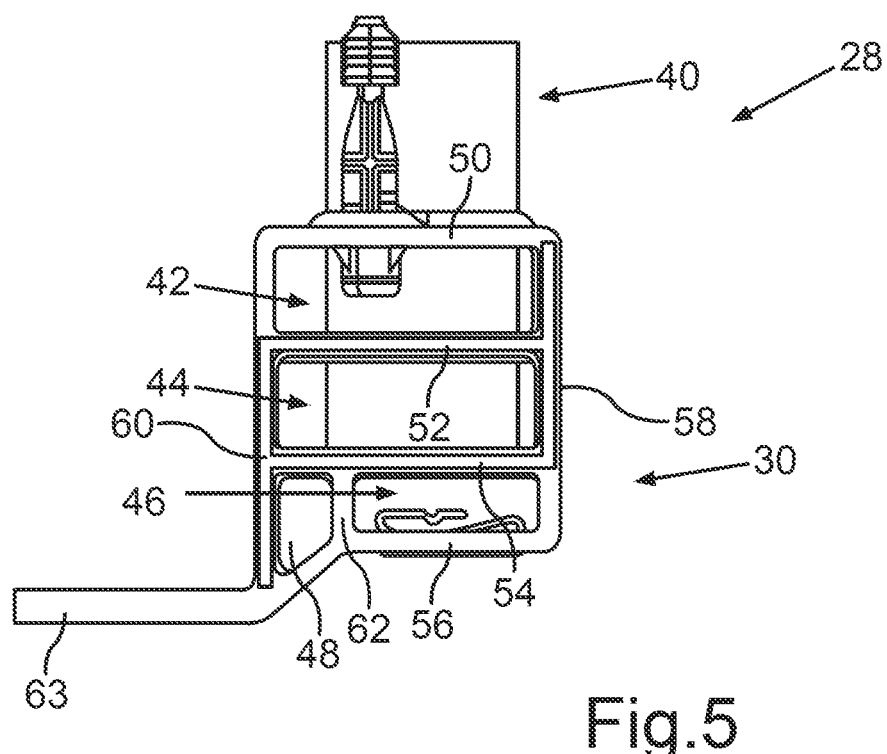
FIG. 5 shows a sectional view through the crossbeam according to FIG. 4, wherein the integration of one of the fixing sleeves can be seen.

As can further be seen when viewed together with FIG. 5, which shows the integration of one of the four fixing sleeves 40 in the crossbeam 30, the respective fixing sleeve 40 is for example installed into a blind hole correspondingly adjusted to the periphery of the latter in the crossbeam 30, and is for example fixed by a suitable joining method such as welding, adhesive bonding or the like.

It can further in particular be seen from FIG. 5 that the crossbeam presently comprises respective chamber walls 50, 52, 54, 56 subdividing a plurality of chambers 42, 44, 46, 48 arranged one on top of the other in the vertical direction of the vehicle (z direction), and chamber walls 58, 56 which delimit and close the crossbeam 30 towards the front or rear in the longitudinal direction of the vehicle (x direction). The lowest chambers 46, 48 are sub-divided by a further chamber wall 62. In addition, the corresponding chamber wall 56 is lengthened on the front lower end by a flange 63.

The respective fixing sleeves 40 are inserted into the crossbeam 30 until they are supported on the chamber wall 54. In addition, the chamber wall 56 has a respective through opening, such that a screw element 64 according to FIG. 7 can be arranged such that it can be inserted through the chamber wall 56 from below and the inner sleeve 32 of the fixing sleeve 40 can be arranged such that it can be passed through, such that via these respective screw elements 64 of the crossbeam 30, and with the interposition of the latter, the battery housing 12 can be fixed to the underside of the rear car bodyshell 10 with its rear end 13, as becomes clear in particular in FIG. 3.

The respective screw elements 64 designed as screws can be screwed into respective thread sleeves 66, which can be seen in FIG. 3 and are for example fixed on the bodyshell in the region of the crossbeam 26. The screws 64 are supported on the underside of the crossbeam 30 with their heads.

It can additionally be seen from FIG. 3 that the crossbeam 30 is connected to the rear end of the battery housing 12 via the flange 63. The crossbeam 30 can, for example, also be part of a supporting frame of the battery housing 12.

Furthermore, in particular when FIGS. 3, 4 and 5 are viewed in combination, it can be seen that the respective fixing sleeves 40 protrude with one end facing towards the rear car bodyshell 10 in relation to the crossbeam 30, and are supported on respective sleeve parts 70, which are designed as part of the battery housing 12 or a corresponding battery support frame. The respective screw elements 64 consequently not only pass through the inner sleeve 32 of the respective fixing sleeve 40, but also the sleeve part 70 of the battery housing 12 respectively attached to the top side. This sleeve part 70 of the battery housing 12 is supported on its top side on the underside of the rear car bodyshell 10 in the region of a wall 72. By tightening the screw elements 64, the battery housing 12—with the interposition of the sleeve parts 70—is thus fixed to the underside of the rear car bodyshell 10 on the rear end by means of the crossbeam 30 and the respective fixing sleeves 40.

If, as a consequence of a frontal collision of the passenger car with an accident partner or an obstacle with low width overlap (offset crash), a movement relative to the battery housing 12 arises, the relative movement indicated with an arrow 74 in FIG. 3 being caused as a consequence of the weight-dependent inertia of the rear car bodyshell 10, then corresponding forces are first diverted via the connecting device 28, in particular with the interposition of the screw elements 64, out of the rear car bodyshell 10, via the connecting device 28, via the crossbeam 30 into the rigid structures.

In a correspondingly significant accident, in which stronger forces or more energy is/are created, a part of this energy is then reduced in the further course of the accident scenario by means of the fixing sleeves 40. It should here be taken into account that the fixing sleeves 40 have a crash structure, in particular via the connecting structure 36, which is formed by the four bars 38, such that if further forces are introduced via the screw elements 64, the sleeves can correspondingly be deformed while absorbing energy. Here, for example, the inner sleeve 32 can be displaced forwards in the longitudinal direction of the vehicle (x direction) as a consequence of a corresponding application of force by the screw element 64 relative to the outer sleeve 34 while absorbing impact energy, in particular within the connecting structure 36 acting as a crash structure.

If the frontal collision is of a strength that the fixing sleeves 40 are also insufficient to absorb the entire impact energy, a further shifting of the rear car bodyshell 10 forwards in the longitudinal direction of the vehicle relative to the battery housing 12 according to the arrow 74 leads the screw elements 64 to finally fail, and for example break as a consequence of a corresponding excessive load. The rear car bodyshell 10 can thus be shifted forwards in the longitudinal direction of the vehicle (x direction) in a controlled manner over the battery housing 12 or the battery modules to be protected arranged within the latter.

Here it can in particular be seen from FIG. 3 that the rear car bodyshell 10 in the underside region and the battery housing 12 in the upper rear region of the end 13 are designed such that such a shift after a failure of the screw elements 64 is possible. Due to the optimal distribution of the large amount of energy arising in the accident on rigid structures of the crossbeam 30, the deformable fixing sleeves 40, and, at the end of the accident scenario, due to the decoupling of the rear car bodyshell 10 from the battery housing 12, an excessive intrusion into the latter and an excessive damage of high-voltage components of the battery can thus be avoided. The coordination of these three elements in the protective mechanism of the described connecting device 28 can be scalably, and thus flexibly, adapted to any other vehicle series with regard to the force level or the energy to be absorbed, which is primarily dependent on a corresponding weight of the rear car bodyshell 10, of the battery house 12 and of the motor car body as a whole.

The crossbeam 30 can be particularly advantageously pre-mounted on the battery housing 12 with the fixing sleeves 40.

It should additionally be noted that, for example, the crossbeam 30 can be adjusted with regard to its chamber walls 50 to 62 such that it too can be optimally coordinated to the series in the absorption of accident energy.

In summary, it remains to be noted that due to the design according to the invention of the connecting device, in a collision, in particular a frontal collision, i.e., an impact on or of the vehicle front, the rear car being pulled behind first diverts the arising forces into the rigid structures via the crossbeam. A part of the energy is dissipated in the deformable sleeves. In the event of an excessive load, the screws break and the bodyshell can shift over the battery modules to be protected. Due to the optimal distribution of the large amount of energy arising in the accident on rigid structures of the battery crossbeam, the deformable sleeves, and in the end due to the decoupling of the bodyshell and the battery, the battery intrusion can be reduced to a minimum, and the high voltage components of the battery remain undamaged even in serious accidents.

The invention claimed is:

1. A connecting device (28) that connects a battery housing (12) to a rear car bodyshell (10) of a body of an electric passenger motor car, comprising:

a crossbeam (30); and a plurality of fixing sleeves (40) that are disposed in the crossbeam (30), wherein each of the plurality of fixing sleeves (40) are passed through by a respective screw element (64) to connect the battery housing (12) to the rear car bodyshell (10) by the crossbeam (30);

wherein the plurality of fixing sleeves (40) each have a crash structure which is deformable when absorbing energy in an event that an accident of the electric passenger motor car causes movement of the rear car bodyshell (10) relative to the battery housing (12);

wherein when the accident is a frontal collision, the plurality of fixing sleeves (40) are deformed before the respective screw elements (64) break;

wherein after the respective screw elements (64) break, the rear car bodyshell (10) shifts forwards in a longitudinal direction of the electric passenger motor car relative to the battery housing (12).

2. The connecting device (28) according to claim 1, wherein the plurality of fixing sleeves (40) have a respective inner sleeve (32) that surrounds the respective screw element (64) and a respective outer sleeve (34) that surrounds the respective inner sleeve (32) and wherein a respective connecting structure (36) is disposed between the respective outer sleeve (34) and the respective inner sleeve (32).

3. The connecting device (28) according to claim 1, wherein the plurality of fixing sleeves (40) protrude from the crossbeam (30) in a direction of the rear car bodyshell (10).

4. The connecting device (28) according to claim 1, wherein the battery housing (12) is passed through by the respective screw elements (64).

5. The connecting device according to claim 1, wherein the crossbeam (30) is pre-mounted on the battery housing (12) with the plurality of fixing sleeves (40).

6. A connecting device (28) that connects a battery housing (12) to a rear car bodyshell (10) of a body of an electric passenger motor car, comprising:

a crossbeam (30); and a plurality of fixing sleeves (40) that are disposed in the crossbeam (30), wherein each of the plurality of fixing sleeves (40) are passed through by a respective screw element (64) to connect the battery housing (12) to the rear car bodyshell (10) by the crossbeam (30);

wherein the plurality of fixing sleeves (40) each have a crash structure which is deformable when absorbing energy in an event that an accident of the electric passenger motor car causes movement of the rear car bodyshell (10) relative to the battery housing (12);

wherein the plurality of fixing sleeves (40) have a respective inner sleeve (32) that surrounds the respective screw element (64) and a respective outer sleeve (34) that surrounds the respective inner sleeve (32) and wherein a respective connecting structure (36) is disposed between the respective outer sleeve (34) and the respective inner sleeve (32);

wherein the respective connecting structure (36) is a plurality of spokes (38) that extend between the respective inner sleeve (32) and the respective outer sleeve (34) in a radial direction to a longitudinal central axis of the respective inner sleeve (32) or the respective outer sleeve (34).

7. A connecting device (28) that connects a battery housing (12) to a rear car bodyshell (10) of a body of an electric passenger motor car, comprising:

a crossbeam (30); and a plurality of fixing sleeves (40) that are disposed in the crossbeam (30), wherein each of the plurality of fixing sleeves (40) are passed through by a respective screw element (64) to connect the battery housing (12) to the rear car bodyshell (10) by the crossbeam (30);

wherein the plurality of fixing sleeves (40) each have a crash structure which is deformable when absorbing energy in an event that an accident of the electric passenger motor car causes movement of the rear car bodyshell (10) relative to the battery housing (12);

wherein the crossbeam (30) has a plurality of chamber walls (50-62) which sub-divide a plurality of chambers (42-48) disposed one above the other in a vertical direction of the electric passenger motor car and wherein the plurality of chamber walls have respective wall strengths that are different from one another.

8. The connecting device (28) according to claim 7, wherein central chamber walls (52-54) of the plurality of chamber walls (50-62) have a greater wall strength relative to outer chamber walls (50, 56) of the plurality of chamber walls (50-62) in relation to the vertical direction of the electric passenger motor car.

* * * * *